United States Patent [19]

Purkayastha

[11] Patent Number: 5,657,193
[45] Date of Patent: Aug. 12, 1997

[54] ELECTRONIC CONTROL MODULE FOR MOTOR CONTROLLER UNITS

[75] Inventor: Indrajit Purkayastha, Weatogue, Conn.

[73] Assignee: General Electric Company, New York, N.Y.

[21] Appl. No.: 592,203

[22] Filed: Jan. 26, 1996

[51] Int. Cl.$^6$ .................................................. H02H 5/04
[52] U.S. Cl. ................... 361/23; 361/93; 361/97; 361/115
[58] Field of Search ........................ 361/93, 115, 23, 361/24, 25, 97; 318/49, 53, 434

[56] References Cited

U.S. PATENT DOCUMENTS

| | | | |
|---|---|---|---|
| 4,025,883 | 5/1977 | Slade et al. | 335/14 |
| 4,243,920 | 1/1981 | Brehm | 318/285 |
| 4,649,455 | 3/1987 | Scott | 361/93 |
| 4,672,501 | 6/1987 | Bilac et al. | 361/96 |
| 4,728,914 | 3/1988 | Morris | 335/6 |
| 5,057,962 | 10/1991 | Alley et al. | 361/24 |
| 5,204,798 | 4/1993 | Scott | 361/93 |
| 5,235,301 | 8/1993 | Dittmann et al. | 335/78 |
| 5,448,442 | 9/1995 | Farag | 361/24 |

FOREIGN PATENT DOCUMENTS 2110447  6/1983  United Kingdom ........... G08B 19/00

*Primary Examiner*—Jeffrey A. Gaffin
*Assistant Examiner*—Stephen Jackson
*Attorney, Agent, or Firm*—Richard A. Menelly; Carl B. Horton

[57] ABSTRACT

A motor controller unit that employs standard motor contactors and electronic circuit breakers includes an electronic control module (ECM) for interfacing with the contactors and circuit breakers. Electrical connection with the circuit breaker electronic trip unit and the ECM is made by means of the circuit breaker rating plug. Electrical connection with the contactors and the ECM is made by means of externally-accessible terminal screws.

10 Claims, 3 Drawing Sheets

ELECTRONIC CONTROL MODULE FOR MOTOR CONTROLLER UNITS

BACKGROUND OF THE INVENTION

The combination of a contactor and circuit breaker for use in motor control applications is described in U.S. Pat. No. 4,025,883 entitled "Modular Integral Motor Controller" wherein a single pair of separable contacts are employed to interrupt motor current upon occurrence of both long time and short time overcurrent conditions.

U.S. Pat. No. 5,057,962 entitled "Microprocessor-Based Protective Relay System teaches the use of a logic circuit to interrupt motor current upon long time overcurrent conditions by comparing real time motor current to set point data tailored to represent thermal conditions within the motor core and windings.

One example of a logic circuit to control the operation of a circuit breaker upon short time overcurrent conditions and a contactor upon long time overcurrent conditions is found in U.S. Pat. No. 5,448,442 entitled "Motor Controller with Instantaneous Trip Protection".

The state of the art motor controller units employing both circuit breakers and contactors in motor controller operations require custom circuits that are designed for each specific application.

It would be economically advantageous to utilize standard circuit breaker and contactor products without having to customize the circuit breaker, contactor or both to insure proper operation.

One purpose of this invention is to interconnect standard motor controller components by means of a simple and inexpensive electronic module to provide a motor controller that exhibits the benefits of both contactor and circuit breaker protection without significant cost increase.

SUMMARY OF THE INVENTION

An ECM for use with motor control centers connects between the contactor and circuit breaker within the control centers. Electrical connection between the control module and the contactor is made by means of standard terminal screws while electrical connection between the control module and the circuit breaker is made by means of the circuit breaker rating plug socket. The current transformers and burden resistors within the circuit breaker are then accessible to the control circuit within the control module.

DESCRIPTION OF THE PREFERRED EMBODIMENT

Figure 1:
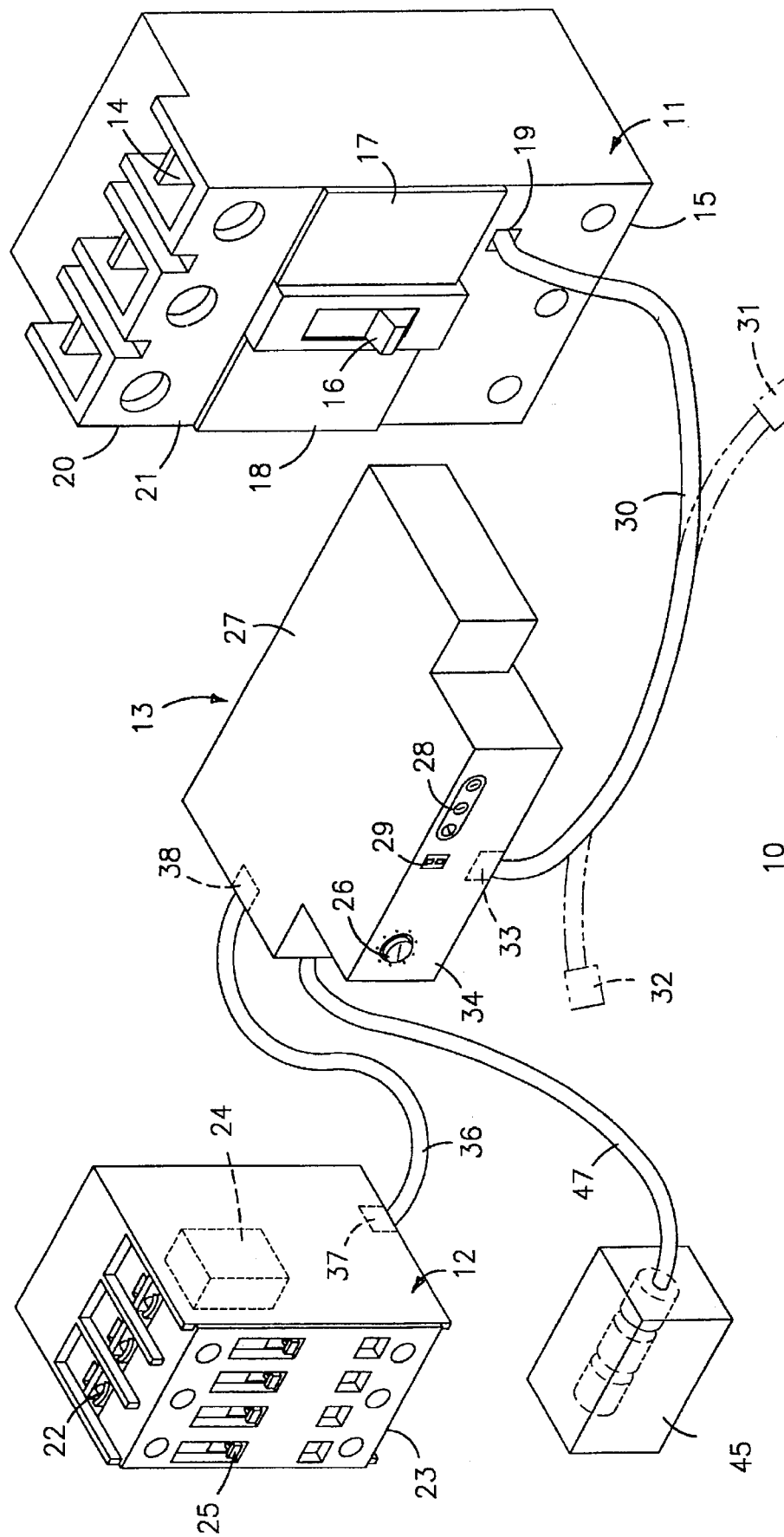
FIG. 1 is top perspective view of a motor controller unit that includes the ECM according to the invention.
Figure 2:
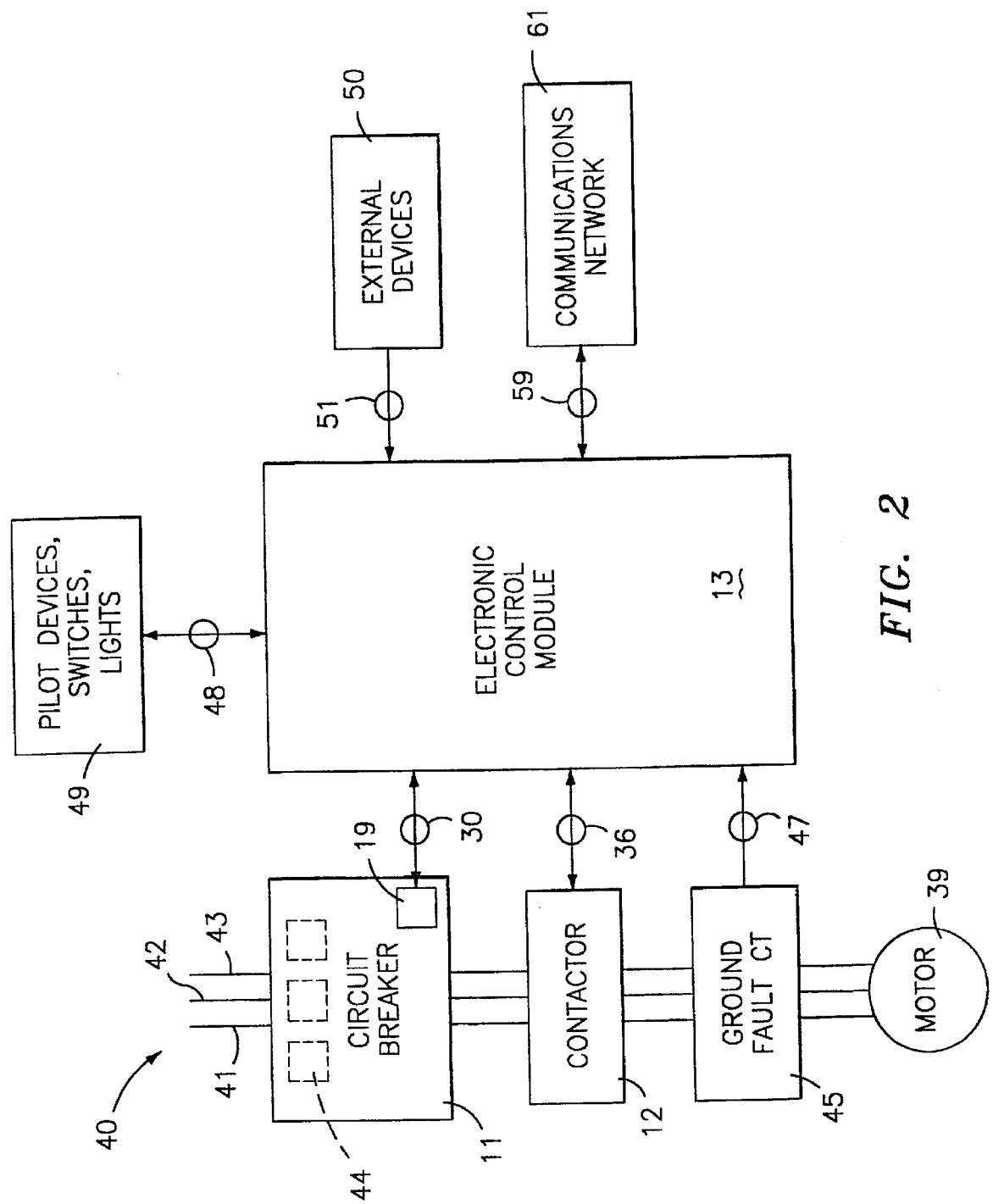
FIG. 2 is a schematic representation of the interconnection between the components of the motor controller unit of FIG. 1.

A simple motor controller unit 10 is shown in FIG. 1 to include an electronic circuit breaker 11 such as described in U.S. Pat. No. 4,672,501 entitled "Circuit Breaker and Protective Relay Unit". The circuit breaker 11 includes an insulative case 20 and an insulative cover 21 that house the interior operating components. Electrical connection with the associated electrical distribution system is made by means of the line terminals 14 at one end and by means of the load terminals 15 at opposite ends thereof. The ON/OFF operating handle 16 extending from the cover allows manual connection and disconnection from the electrical distribution system. As described within the aforementioned U.S. Pat. No. 4,672,501, a pair of accessory compartments 17, 18 on the cover 21 allow field installation of accessories such as shunt trip units, bell alarms and the like. In accordance with the invention, the rating plug 19 which sets the circuit breaker ampere rating, is used to electrically interconnect with the electronic control module 13, hereinafter "ECM", and the circuit breaker 11 by means of the cable 30. The electronic circuit within the rating plug is described in U.S. Pat. No. 4,649,455 entitled "Rating Plug for Molded Case Circuit Breaker" and the electrical socket connection is described within U.S. Pat. No. 4,728,914 entitled "Rating Plug Enclosure for Molded Case Circuit Breaker", respectively. As indicated in phantom, the electrical plug 31 at one end of the cable 30 is received within the rating plug socket and the telephone type plug 32 at the opposite end is received in the telephone type receptacle 33 in in the ECM 13. A dial 26 on the front face 34 of the ECM insulative enclosure 27 is used to set the current rating of the associated contactor 12 in accordance with the current rating of the circuit breaker 11. The switches 29 allow selection of other functions available with the ECM such as ground fault and phase unbalance or phase loss. The dials or binary switches 28 also located on the front cover 34 of the ECM 13 set the communication address of the particular motor controller unit when several units are used within an entire motor control system. Ground fault determination capability is provided by means of the ground current transformer 45. The ground current transformer connects with the terminal strip 38 on the ECM by means of a standard electric cable 47. In further accordance with the invention, the contactor 12 interconnects with the ECM 13 by means of a standard electric cable 36 which connects with the contactor at one end by means of the terminal screw 37 and connects with the terminal strip 38 on the ECM at the opposite end. The contactor 12 is a standard magnetic contactor having line and load contacts 22, 23 at opposite ends interconnected by moveable contacts 25 under control of the contactor coil 24. The contactor coil receives connect and disconnect commands from the ECM over cable 36 in a manner similar to that described in U.S. Pat. No. 5,057,962 entitled "Microprocessor-Based Protective Relay System". The contactor can be replaced with an electromagnetic relay such as that described in U.S. Pat. No. 5,235,301 entitled "Electromagnetic Relay". The electrical connections with the ECM are best seen by now referring to the schematic arrangement of the ECM 13 shown in FIG. 2. The electrical distribution system 40 includes three phases carried by conductors 41–43 which are sampled by means of three separate current transformers contained within the circuit breaker 11 connected in series within the electrical distribution system. Electrical connection with the ECM is made by means of the circuit breaker rating plug 19 over the connector cable 30 as described earlier. The contactor 12 is electrically connected in series within the electrical distribution system and connects with the ECM by means of the connector cable 36. The information supplied from the circuit breaker rating plug connection, i.e. the current supplied over the conductors 41–43 provides indication of the current supplied to each phase of the electric motor 39. The ECM then samples the current in each of the three phases in a similar manner as that described in aforementioned U.S. Pat. No. 5,075,962 to insure that the motor does not become overheated at any time upon occurrence of a so-called "long time" overcurrent condition. In the event that such an overcurrent condition is detected, the ECM de-energizes the contactor coil 24 to disengage the contacts 25 shown earlier in FIG. 1. An additional ground fault current transformer 45 sends a signal over conductor 47 to the ECM for ground fault determination and interruption of the contacts within the contactor. Connection with remote devices such as programmable logic controllers, computerized numerical controllers and the like is made by means of the connector 51 and connection with the local communications network 61 is made by means of the communications bus 59. To provide remote indication of the operation of the contactor 12, remote switches and lights 49 are connected with the ECM over cable 48.

Figure 3:
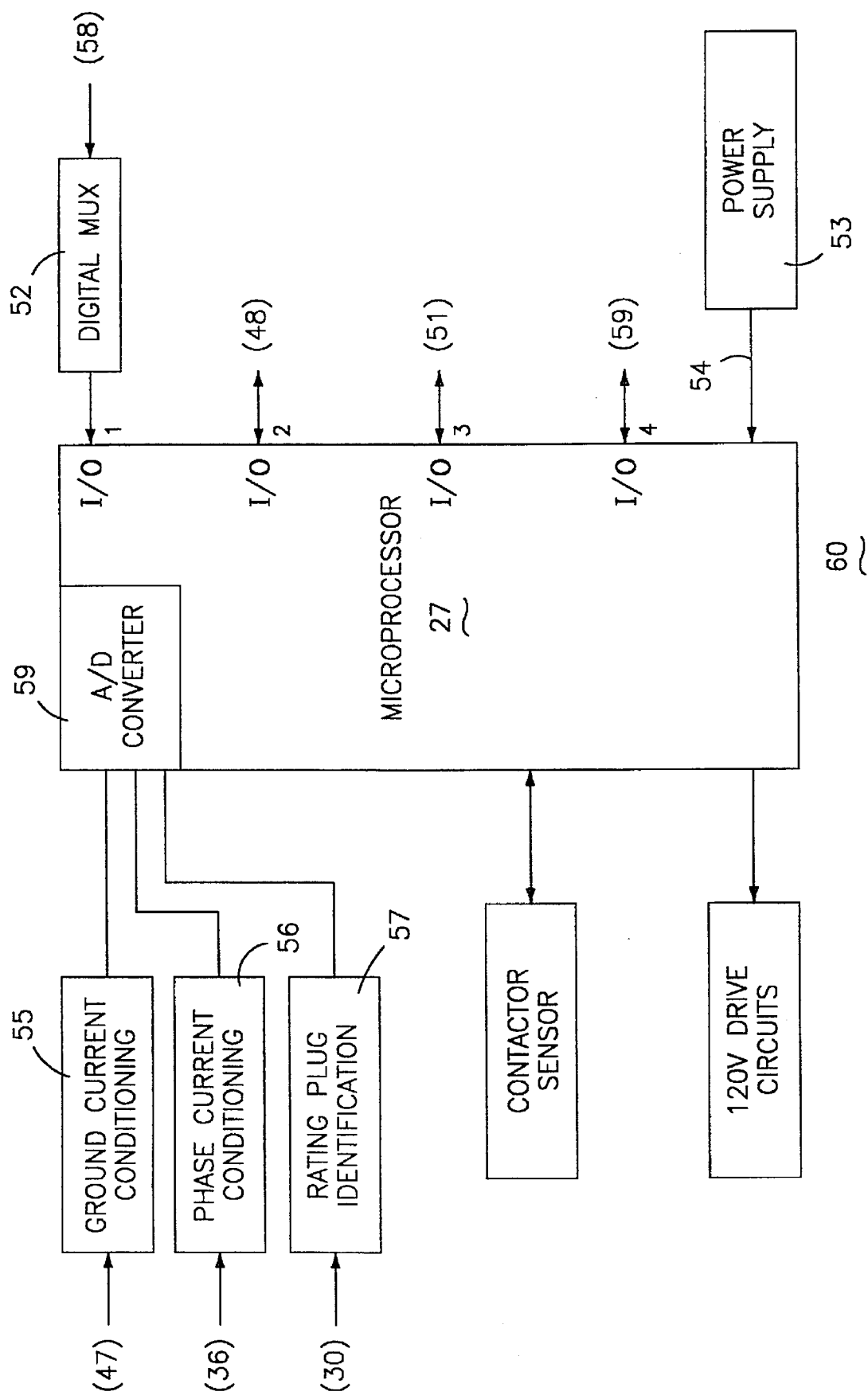
FIG. 3 is a schematic representation of the circuits contained within the ECM of FIG. 2.

The ECM circuit 60 within the ECM 13 is shown in FIG. 3 in its simplest form to include a ground current conditioning circuit 55, phase current conditioning circuit 56 and rating plug identification circuit 57 all of which connect with the A/D converter 59 within the custom microprocessor 27. Operation of the ECM is best understood by referring to FIGS. 1, 2, and 3 simultaneously. The conditioning circuits are similar to those described in the aforementioned U.S. Pat. No. 4,672,501 whereby the motor current is rectified before being inputted to the A/D converter. Cables 30, 36, and 47 provide information to these circuits for operation by the microprocessor. The information supplied to and from the components mounted on the front panel 34 of FIG. 1 over cable 58 is supplied to the first I/O port through a digital multiplexer 52. The information to and from the remote switches and lights 49 supplied to the second I/O port over cable 48. Information to and from external devices 50, such as programmable logic controllers and computerized numerical controllers for machinery and the like is supplied to the third I/O port over cable 51. Communication with the local communication network 61 is carried on over the data bus 59 which connects with the fourth I/O port. Operating power to the microprocessor is provided by means of a separate power supply 53 that connects with the microprocessor by means of conductor 54.

An electronic control module has herein been described that allows standard electrical components within motor control centers to become interconnected for sharing of motor current information. The use of standard circuit breakers and contactors without modification results in a substantial savings to the motor control center customer.

I claim:
1. A motor control unit comprising:
a circuit breaker arranged for connection within an electrical distribution circuit to determine the occurrence of an overcurrent condition and interrupt motor current upon occurrence of an overcurrent condition of a first predetermined magnitude, said first predetermined magnitude comprises short time overcurrent conditions; said circuit breaker including a current transformer arranged for providing data representative of motor current;
a rating plug connecting with said circuit breaker for providing an ampere rating to said circuit breaker;
a control module connecting with said rating plug and said current transformer to determine the occurrence of an overcurrent condition of a second predetermined magnitude; and
a contactor connecting with said control module to interrupt motor current upon occurrence of an overcurrent condition of a second predetermined magnitude.

2. The motor control unit of claim 1 wherein said contactor includes a pair of separable contacts and an electric coil controlling On and OFF states of said separable contacts.

3. The motor control unit of claim 1 wherein said circuit breaker and said contactor are electrically-connected in series.

4. The motor control unit of claim 1 wherein said first predetermined magnitude is greater than said second predetermined magnitude.

5. The motor control unit of claim 1 wherein said first predetermined magnitude comprises short time overcurrent conditions.

6. The motor control unit of claim 1 wherein said second predetermined magnitude comprises long time overcurrent conditions.

7. The motor control unit of claim 1 wherein said circuit interrupter comprises an electromagnetic relay.

8. The motor control unit of claim 1 wherein said control module comprises a microprocessor and an A/D converter.

9. The motor control unit of claim 1 wherein said control module includes means for providing an identification address.

10. The motor control unit of claim 9 wherein said identification address means comprises a binary switch.

* * * * *